United States Patent
Okada et al.

(10) Patent No.: US 10,393,966 B2
(45) Date of Patent: Aug. 27, 2019

(54) COMPOSITE OPTICAL WAVEGUIDE

(71) Applicant: AGC INC., Chiyoda-ku (JP)

(72) Inventors: Toshihisa Okada, Tokyo (JP); Seiki Ohara, Tokyo (JP); Shotaro Takenobu, Tokyo (JP); Satoko Noma, Tokyo (JP)

(73) Assignee: AGC Inc., Chiyoda-ku (JP)

( * ) Notice: Subject to any disclaimer, the term of this patent is extended or adjusted under 35 U.S.C. 154(b) by 0 days.

(21) Appl. No.: 16/131,851

(22) Filed: Sep. 14, 2018

(65) Prior Publication Data
US 2019/0025519 A1 Jan. 24, 2019

Related U.S. Application Data

(63) Continuation of application No. PCT/JP2017/010424, filed on Mar. 15, 2017.

(30) Foreign Application Priority Data

Mar. 23, 2016 (JP) ................... 2016-058907

(51) Int. Cl.
  *G02B 6/12* (2006.01)
  *G02B 6/138* (2006.01)
  (Continued)

(52) U.S. Cl.
  CPC ............ *G02B 6/30* (2013.01); *G02B 6/12* (2013.01); *G02B 6/1223* (2013.01); *G02B 6/138* (2013.01); *G02B 6/26* (2013.01)

(58) Field of Classification Search
  None
  See application file for complete search history.

(56) References Cited

U.S. PATENT DOCUMENTS

8,724,937 B2   5/2014 Barwicz et al.
2005/0265686 A1  12/2005 Nishichi et al.
(Continued)

FOREIGN PATENT DOCUMENTS

JP  2004-157200  6/2004
JP  2005-241812  9/2005
(Continued)

OTHER PUBLICATIONS

International Search Report dated Jun. 13, 2017 in PCT/JP2017/010424, filed on Mar. 15, 2017 (with English Translation).
(Continued)

*Primary Examiner* — Jerry Rahll
(74) *Attorney, Agent, or Firm* — Oblon, McClelland, Maier & Neustadt, L.L.P.

(57) ABSTRACT

The present invention relates to a composite optical waveguide (1) containing a polymer optical waveguide and a silicon optical waveguide adiabatically coupled to each other, in which the polymer optical waveguide and the silicon optical waveguide are coupled to each other by an adhesive layer in an adiabatic-coupling portion where a core of the polymer optical waveguide and a core of the silicon optical waveguide are disposed to face each other, the adhesive layer is formed by using a photocurable adhesive having a glass transition point Tg being 125° C. or higher after curing, and the adiabatic-coupling portion includes a region in which a spacing t between the core of the polymer optical waveguide and the silicon optical waveguide is 1.5 μm or less.

14 Claims, 3 Drawing Sheets

(51) Int. Cl.
*G02B 6/26* (2006.01)
*G02B 6/30* (2006.01)
*G02B 6/122* (2006.01)

(56) References Cited

U.S. PATENT DOCUMENTS

| | | |
|---|---|---|
| 2005/0282996 A1 | 12/2005 | Nishichi et al. |
| 2009/0184383 A1 | 7/2009 | Seeds et al. |
| 2013/0156365 A1* | 6/2013 | Barwicz .................. G02B 6/30 385/14 |
| 2013/0322813 A1 | 12/2013 | Grondin et al. |
| 2014/0112616 A1 | 4/2014 | Numata |
| 2014/0294341 A1 | 10/2014 | Hatori et al. |

FOREIGN PATENT DOCUMENTS

| | | |
|---|---|---|
| JP | 2006-98606 | 4/2006 |
| JP | 2006-152113 | 6/2006 |
| JP | 2006-195262 | 7/2006 |
| JP | 2007-86330 | 4/2007 |
| JP | 2009-205105 | 9/2009 |
| JP | 2009-531847 | 9/2009 |
| JP | 2010-254792 | 11/2010 |
| JP | 4896231 | 3/2012 |
| JP | 2013-185056 | 9/2013 |
| JP | 2014-081586 | 5/2014 |
| JP | 2014-191301 | 10/2014 |

OTHER PUBLICATIONS

Written Opinion dated Jun. 13, 2017 in PCT/JP2017/010424, filed on Mar. 15, 2017.

\* cited by examiner

COMPOSITE OPTICAL WAVEGUIDE

TECHNICAL FIELD

The present invention relates to a composite optical waveguide obtained through an adiabatic-coupling of a polymer optical waveguide (POW) and a silicon (Si) optical waveguide.

BACKGROUND ART

Multimode and single-mode polymer optical waveguides, which are rigid and formed on a printed board, or flexible and formed on a polymer base film, have been widely used. The principle of the polymer optical waveguide is that, depending on a combination of a core and a clad, which is a combination of a plurality of polymers having different refractive indexes, the core is set as an optical waveguide.

On the other hand, a silicon optical waveguide, which has an optical waveguide formed on a silicon chip, has been also widely used (refer to PTL 1).

In both of the polymer optical waveguide and the silicon optical waveguide, a plurality of waveguides are formed in an array manner in a form arranged in parallel along one direction in order to obtain a plurality of waveguide channels.

Although attempts have been made to propagate light between the polymer optical waveguide and the silicon optical waveguide, a high-precision positioning is required to realize a coupling of efficiently propagating light at a microlevel.

In the case of the multimode optical waveguide, in coupling between optical waveguides or between an optical waveguide and a multimode optical fiber, since the size of core cross-sections are large and both are similar to each other in the size of core cross-sections or the number of apertures, if accuracy of butt positioning of the cross-sections is ensured in the cross-sections to be in contact with each other, coupling can be realized with allowable level of loss.

Actually, this has been realized by so-called butt-coupling.

However, in coupling between a single-mode optical waveguide and a silicon optical waveguide, since core cross-sections become considerably small and both have significant differences in the size of core cross-sections or the number of apertures, butt-coupling itself becomes difficult.

Accordingly, a method expected as an alternative is an adiabatic-coupling that captures and communicates light (hereinafter, referred to as evanescent light) seeped out from an optical axis direction along the array, over a predetermined distance in the optical axis direction.

For this reason, attention has been recently paid to a composite optical waveguide obtained through an adiabatic-coupling of a polymer optical waveguide and a silicon optical waveguide (refer to PTLs 1 and 2).

CITATION LIST

Patent Literature

PTL 1: JP-A-2014-81586
PTL 2: U.S. Pat. No. 8,724,937

SUMMARY OF INVENTION

Technical Problem

In the case of butt-coupling a polymer optical waveguide and a silicon optical waveguide, both waveguides are coupled by using a photocurable adhesive. In the case of adiabatic-coupling, the both waveguides are also coupled by using a photocurable adhesive.

However, when performing the adiabatic-coupling, how to bond the polymer optical waveguide and the silicon optical waveguide in a highly reliable way has not been discussed much to the present. The present inventors carried out intensive examination on this point. As a result, they revealed that exfoliation occurs in the reliability test in some cases when a photocurable adhesive capable of realizing highly reliable coupling in the butt-coupling, which is currently a mainstream, is used in the adiabatic-coupling.

In order to solve the above problem of the above-described technique in the related art, an object of the present invention is to improve reliability on an adiabatic-coupling portion in a composite optical waveguide where a polymer optical waveguide and a silicon optical waveguide are adiabatically coupled to each other.

Solution to Problem

In order to achieve the above-described object, the present invention provides a composite optical waveguide (1) containing a polymer optical waveguide and a silicon optical waveguide adiabatically coupled to each other, in which the polymer optical waveguide and the silicon optical waveguide are coupled to each other by an adhesive layer in an adiabatic-coupling portion where a core of the polymer optical waveguide and a core of the silicon optical waveguide are disposed to face each other, the adhesive layer is formed by using a photocurable adhesive having a glass transition point Tg being 125° C. or higher after curing, and the adiabatic-coupling portion includes a region in which a spacing t between the core of the polymer optical waveguide and the silicon optical waveguide is 1.5 µm or less.

In addition, the present invention provides a composite optical waveguide (2) containing a polymer optical waveguide and a silicon optical waveguide adiabatically coupled to each other, in which the polymer optical waveguide and the silicon optical waveguide are coupled to each other by an adhesive layer in an adiabatic-coupling portion where a core of the polymer optical waveguide and a core of the silicon optical waveguide are disposed to face each other, the adhesive layer is formed by using a photocurable adhesive having a glass transition point Tg after curing being 125° C. or higher and having a transmittance of light with a wavelength of 1.3 µm being 80% or greater at a thickness of 0.1 mm after curing, and the adiabatic-coupling portion includes a region in which a spacing t between the core of the polymer optical waveguide and the silicon optical waveguide is 1.5 µm or less.

Furthermore, the present invention provides a composite optical waveguide (3) containing a polymer optical waveguide and a silicon optical waveguide adiabatically coupled to each other, in which the polymer optical waveguide and the silicon optical waveguide are coupled to each other by an adhesive layer in an adiabatic-coupling portion where a core of the polymer optical waveguide and a core of the silicon optical waveguide are disposed to face each other, the adhesive layer is formed by using a photocurable adhesive having a glass transition point Tg after curing being 125° C.

or higher and satisfying $-0.015<n1-nA<0.05$ where n1 represents a refractive index of a clad of the polymer optical waveguide and nA represents a refractive index of the adhesive after curing, and the adiabatic-coupling portion includes a region in which a spacing t between the core of the polymer optical waveguide and the silicon optical waveguide is 1.5 µm or less.

In the composite optical waveguides (1) to (3) of the present invention, the photocurable adhesive preferably shows a mass reduction amount of 6% or less between before and after being maintained in an atmosphere at 150° C. for 100 hours after photocuring.

In the composite optical waveguides (1) to (3) of the present invention, the photocurable adhesive preferably shows a mass increase amount of 1% or less between before and after being immersed in water for 24 hours after photocuring.

In the composite optical waveguides (1) to (3) of the present invention, the photocurable adhesive preferably has an average coefficient of thermal expansion of less than $130 \times 10^{-6}$/° C. at a range of from 25° C. to 100° C.

In the composite optical waveguides (1) to (3) of the present invention, the polymer optical waveguide preferably contains the core and a clad, and the core and the clad are preferably made of a fluorine-containing resin.

In this case, the photocurable adhesive preferably contains a fluorine material.

Advantageous Effects of Invention

The composite optical waveguide of the present invention contains a polymer optical waveguide and a silicon optical waveguide coupled to each other by using a photocurable adhesive having a glass transition point Tg after photocuring being 125° C. or higher, and has a region in which a spacing t between the core of the polymer optical waveguide and the silicon optical waveguide is 1.5 µm or less. Therefore, in a heat cycle test, it is free from the risk that the adhesive layer and a subject to be adhered (configured of the polymer optical waveguide and the silicon optical waveguide) are exfoliated from each other, and reliability of the adiabatic-coupling portion is improved.

In addition, the photocurable adhesive used for forming the adhesive layer has a transmittance of light with a wavelength of 1.3 µm being 80% or greater at a thickness of 0.1 mm after photocuring or satisfies $-0.015<n1-nA<0.05$ and thus, propagation loss of light propagating the composite optical waveguide is small.

DESCRIPTION OF EMBODIMENTS

Hereinafter, the present invention will be described with reference to drawings.

Figure 1:
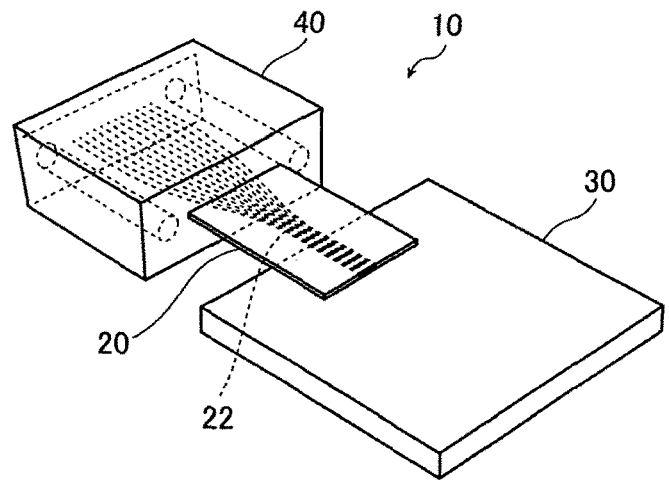
FIG. 1 is a perspective view illustrating a configuration example of a composite optical waveguide of the present invention.
Figure 2:
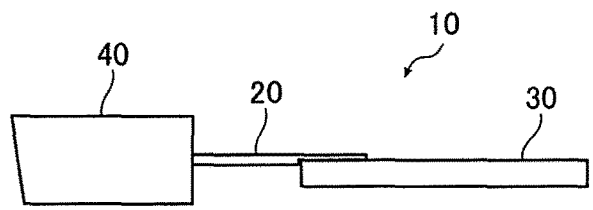
FIG. 2 is a side view of the composite optical waveguide 10 of FIG. 1.
Figure 3:
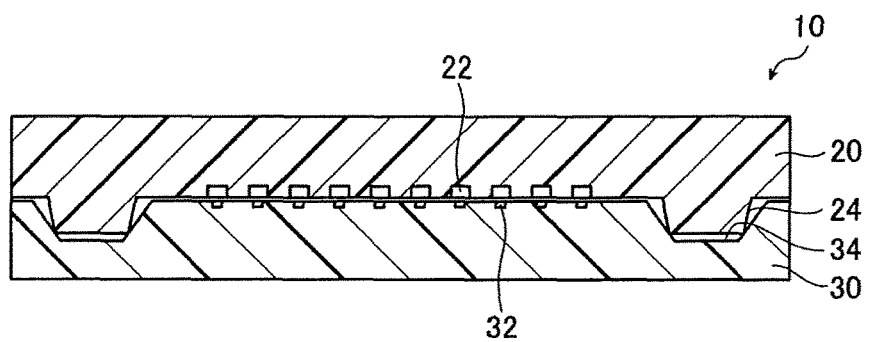
FIG. 3 is a vertical cross-sectional view of an adiabatic-coupling portion of the composite optical waveguide 10 of FIG. 1.

FIG. 1 is a perspective view illustrating a configuration example of a composite optical waveguide of the present invention. FIG. 2 is a side view of the composite optical waveguide 10 of FIG. 1. FIG. 3 is a vertical cross-sectional view of an adiabatic-coupling portion of the composite optical waveguide 10 of FIG. 1.

In the composite optical waveguide 10 illustrated in FIGS. 1 to 3, a polymer optical waveguide 20 and a silicon optical waveguide 30 are adiabatically coupled to each other. In the polymer optical waveguide 20 illustrated in FIGS. 1 and 2, the other end side opposite to an adiabatic-coupling portion is housed in a connector 40 for connection. In the polymer optical waveguide 20 and the silicon optical waveguide 30 illustrated in FIG. 3, portions other than cores 22 and 32 are clads.

Figure 4:
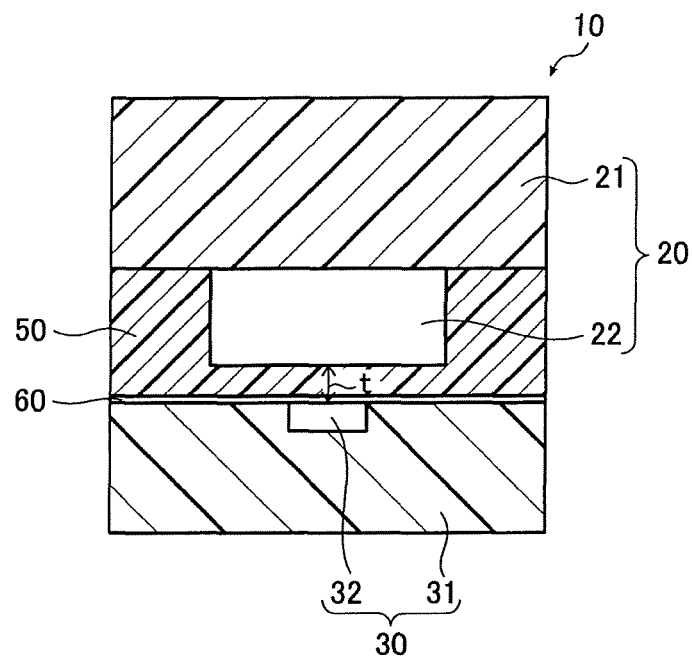
FIG. 4 is a partial enlarged view of FIG. 3.

FIG. 4 is a partial enlarged view of FIG. 3, and illustrates a positional relationship between the core 22 of the polymer optical waveguide 20 and the silicon optical waveguide 30 in the adiabatic-coupling portion. In the polymer optical waveguide 20 and the silicon optical waveguide 30 illustrated in FIG. 4, portions other than the cores 22 and 32 are clads 21 and 31.

As illustrated in FIG. 4, in the adiabatic-coupling portion, the core 22 of the polymer optical waveguide 20 and the core 32 of the silicon optical waveguide 30 are disposed in a state of facing each other and bonded to each other with an adhesive layer 50. Here, on a surface on a side of the adhesive layer 50 of the silicon optical waveguide 30, a barrier layer 60 for suppressing diffusion of alkali metal ions such as sodium is formed. The thickness of the barrier layer 60 is from 0.01 to 0.5 µm, for example. As the constituent materials of the barrier layer 60, $Si_3N_4$ can be used, for example.

Figure 5:
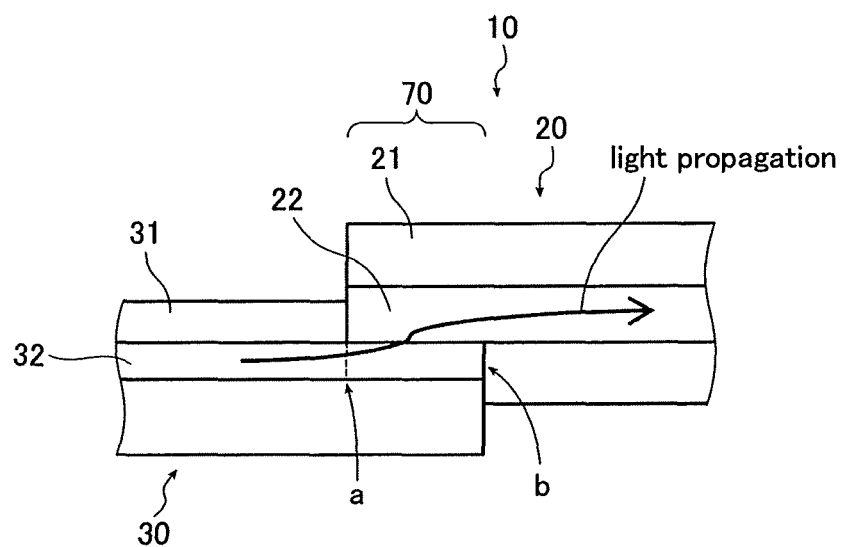
FIG. 5 is a partial longitudinal cross-sectional view of the periphery of the adiabatic-coupling portion of the composite optical waveguide 10 of FIG. 1.

FIG. 5 is a partial longitudinal cross-sectional view of the adiabatic-coupling portion 70 of the composite optical waveguide 10 of FIG. 1, and illustrates an aspect of light propagation of evanescent light in the adiabatic-coupling portion 70.

In the adiabatic-coupling, evanescent light is captured and communicated over a predetermined distance in an optical axis direction. For this reason, in the adiabatic-coupling portion, although the core 22 of the polymer optical waveguide 20 and the core 32 of the silicon optical waveguide 30 are disposed to face each other as illustrated in FIG. 5, the polymer optical waveguide 20 has no clad provided on a side facing the core 32 of the silicon optical waveguide 30 and the core 22 is exposed. In addition, in order to arrange the core 22 of the polymer optical waveguide 20 and the core 32 of the silicon optical waveguide 30 so as to be in an appropriate positional relationship, a positioning projection portion 24 is provided in the polymer optical waveguide 20 and a positioning concave portion 34 is provided in the silicon optical waveguide 30, respectively.

In the case of butt-coupling, if a thickness of an adhesive layer is thin, an increase in coupling loss is caused, and, in a worst case, exfoliation at an interface is caused under a high-temperature high-humidity environment. Therefore, it has been required to set the thickness of the adhesive layer to be 10 µm or greater (e.g., specification of Japanese Patent No. 4896231, etc.).

This is caused by a stress (heat strain) generated due to a difference in coefficients of thermal expansion occurring between a constituent material of the adhesive layer and a constituent material of a fiber or optical waveguide, and for the adhesive layer itself to mitigate the generated stress, it is required to have a thickness of 10 µm or greater.

Since evanescent light is used in the case of adiabatic-coupling, if the thickness of the adhesive layer becomes large, transmission efficiency of light is remarkably lowered.

For this reason, the adiabatic-coupling portion 70 of the composite optical waveguide 10 of the present invention has a region in which a spacing t between the core 22 of the polymer optical waveguide 20 and the silicon optical waveguide 30 is 1.5 μm or less. As a form of the thickness of the adhesive layer 50 of the present invention, the spacing t between the core 22 of the polymer optical waveguide 20 and the silicon optical waveguide 30 may be uniform or may be non-uniform. The spacing t between the core 22 and the silicon optical waveguide 30 being non-uniform means a structure in which a spacing on side a of FIG. 5 is narrow and a spacing on side b is wide, for example. In the case where the spacing t between the core 22 and the silicon optical waveguide 30 is non-uniform, the spacing t is preferably 1.5 μm or less in 50% or greater of the region in which the core 22 of the polymer optical waveguide 20 and the core 32 of the silicon optical waveguide 30 facing each other. With the spacing t being 1.5 μm or less in 50% or greater of the region, efficiency of light propagation becomes high and generation of exfoliation can be suppressed. The region in which the spacing t is 1.5 μm or less is preferably 70% or greater, more preferably 80% or greater, further more preferably 90% or greater, and it is particularly preferable that the spacing t is 1.5 μm or less in the entire region. The spacing t between the core 22 of the polymer optical waveguide 20 and the silicon optical waveguide 30 is more preferably 1.3 μm or less, further more preferably 1.0 μm or less, and most preferably 0.8 μm or less.

The composite optical waveguide 10 of the present invention has the region in which the spacing t between the core 22 of the polymer optical waveguide 20 and the silicon optical waveguide 30, corresponding to the thickness of the adhesive layer, is 1.5 μm or less. Therefore, stress mitigation due to the adhesive layer, as in the case of the butt-coupling, cannot be expected. Thus, the present inventors examined physical properties of the photocurable adhesive used in formation of the adhesive layer in an approach not to generate stress on the adhesion interface, and found physical properties required for improving reliability of the adiabatic-coupling portion and a threshold value thereof, thereby completing the present invention.

According to common technical knowledge in the related art, under the circumstance where the thickness of the adhesive layer becomes inevitably thin, it has been considered that the use of a photocurable adhesive having a low glass transition point Tg after photocuring is preferable. This is because it is considered that, in order to mitigate stress inside the adhesive layer, it is effective to utilize a characteristic of the photocurable adhesive of being rapidly softened when the temperature exceeds the glass transition point Tg after photocuring, whereby the stress is easily mitigated even when the adhesive layer is thin. In this case, a use temperature of the optical waveguide composite can be set higher than the glass transition point Tg after photocuring of the photocurable adhesive. For this, the use of a photocurable adhesive having a low glass transition point Tg after photocuring is preferable.

However, as a result of series of examination of this time, the present inventors reached consequences that exfoliation is not caused even when a photocurable adhesive having a high glass transition point Tg after photocuring is used in the case where the spacing t between the core 22 of the polymer optical waveguide 20 and the silicon optical waveguide 30, corresponding to the thickness of the adhesive layer, is as extraordinarily small as 1.5 μm or less. In addition, it was also revealed that, in view of enhancing reliability of the coupling of the adiabatic-coupling, a photocurable adhesive having a high glass transition point Tg after photocuring is rather appropriate for this coupling method.

In order to confirm that the composite optical waveguide can be stably and continuously used by assuming an actual use environment, a heat cycle test was conducted. As a result, it was found that the photocurable adhesive used in formation of the adhesive layer preferably has a high glass transition point.

When the composite optical waveguide is at a high temperature during the heat cycle test, due to a great change in a coefficient of thermal expansion of the photocurable adhesive with the glass transition point Tg after photocuring as a boundary, a change in volume of the photocurable adhesive (adhesive layer) is further increased. With this, stress between the adhesive layer and the polymer optical waveguide and silicon optical waveguide, which are subjects to be adhered, is generated, and thus exfoliation is easily caused.

By using a photocurable adhesive having a glass transition point Tg after photocuring which is higher than the highest temperature of the heat cycle test, the coefficient of thermal expansion of the photocurable adhesive does not become remarkably high at the time of carrying out the heat cycle test. As a result, increase or decrease in volume of the adhesive layer at the time of carrying out the heat cycle test becomes small, and the stress at the adhesion interface becomes small. Accordingly, exfoliation at the interface between the adhesive layer and the subject to be adhered can be prevented.

From the above, in order to improve reliability of the adiabatic-coupling portion, a photocurable adhesive having a glass transition point Tg after photocuring which is higher than an upper limit temperature of the heat cycle test is used to form the adhesive layer of the composite optical waveguide in the present invention. In Examples to be described later, the upper limit temperature of the heat cycle test (−50° C. to 125° C.) is 125° C. For this reason, a photocurable adhesive having a glass transition point Tg after photocuring of 125° C. or higher is used to form the adhesive layer of the composite optical waveguide in the present invention. The photocurable adhesive in the present specification is an adhesive that is curable by light emission, and an ultraviolet curable adhesive and an electron beam emission adhesive are included.

In addition, the reason that the heat cycle test was performed in a range of from −50° C. to 125° C. in Examples to be described later is as described below.

As for test conditions of the heat cycle test, referring to the Telcordia standards of from −40° C. to 85° C., which is generally used in the field of communication, assuming the use applications for super computers, high-end servers and the like which require high reliability, and considering margins for the upper and lower limits, the test is carried out in a range of from −50° C. to 125° C.

In the present invention, in the formation of the adhesive layer of the composite optical waveguide, a photocurable adhesive having a glass transition point Tg after photocuring of 125° C. or higher is preferably used, a photocurable adhesive having a glass transition point Tg after photocuring of 135° C. or higher is more preferably used, and a photocurable adhesive having a glass transition point Tg after photocuring of 140° C. or higher is further more preferably used.

As described above, in the adiabatic-coupling, since evanescent light is captured and communicated over a predetermined distance in an optical axis direction, the photocurable adhesive used in formation of the adhesive layer is required to transmit light that propagates the composite optical waveguide. In the present invention, a light-transmissive adhesive having a transmittance of light with a wavelength of 1.3 μm being 80% or greater at a thickness of 0.1 mm after photocuring is used to form the adhesive layer of the composite optical waveguide. The reason for this is that propagation loss when light propagating the composite optical waveguide passes through the adhesive layer is extraordinarily reduced.

In the formation of the adhesive layer of the composite optical waveguide, a photocurable adhesive having a transmittance of light with a wavelength of 1.3 μm being 85% or greater at a thickness of 0.1 mm after photocuring is preferably used, and a light-transmissive adhesive having a light transmittance of 90% or greater is more preferably used.

Since light propagates inside the core in the polymer optical waveguide, the constituent materials of the core and the clad are selected such that a refractive index of the clad is lower than a refractive index of the core.

As illustrated in FIGS. 4 and 5, in the adiabatic-coupling portion, the core 22 of the polymer optical waveguide 20 is exposed and the adhesive layer 50 is present in the periphery of the core 22.

In order to suppress propagation loss of light in the composite optical waveguide 10, a photocurable adhesive used in formation of the adhesive layer 50 is preferably selected such that a refractive index of the adhesive layer 50 is at the same level of the refractive index of the clad of the polymer optical waveguide 20. Specifically, when the refractive index of the clad of the polymer optical waveguide 20 is denoted by n1, a refractive index nA of the photocurable adhesive used in formation of the adhesive layer 50 after photocuring preferably satisfies the following formula (1), in order to suppress propagation loss of light in the composite optical waveguide 10.

$$-0.015 < n1 - nA < 0.05 \quad (1)$$

In the case where n1−nA is larger than the above range, since the light confinement effect of the clad is too large, the amount of light propagating between the polymer optical waveguide 20 and the silicon optical waveguide 30 is reduced due to a decrease in the evanescent light, and as a result, propagation loss is increased. On the other hand, in the case where n1−nA is smaller than the above range, since the light confinement after propagation to the polymer optical waveguide 20 is weak, there is a possibility that problems such as deterioration of propagation loss and crosstalk with the adjacent core occur. As can be recognized from the above-mentioned formula, as an appropriate refractive index range of the adhesive after photocuring, it was revealed by the simulation of this time that there is no preferable range with the same spacing on high and low value sides but the range on the low value side is narrow.

In the composite optical waveguide 10 of the present invention, the refractive index nA of the photocurable adhesive used in formation of the adhesive layer 50 after photocuring more preferably satisfies the following formula (2).

$$-0.013 < n1 - nA < 0.03 \quad (2)$$

The refractive index nA further preferably satisfies −0.01<n1−nA<0.02, and most preferably satisfies −0.005<n1−nA<0.015.

The composite optical waveguide of the present invention is mounted on an electronic circuit board and used as an electronic composite board in some cases. In this case, the polymer optical waveguide 20 and the silicon optical waveguide 30 are adiabatically coupled by the adhesive layer 50, and then the resultant is mounted on the electronic circuit board. In this case, after being mounted on the electronic circuit board, a high-temperature process is performed in some cases. For example, when mounting a semiconductor chip or a device on the electronic circuit board, there is a case where a high-temperature process at 260° C. for several minutes is performed a plurality of times, as a general reflow process using a lead-free solder. In addition, in recent years, development of a low-temperature lead-free solder mountable at around 160° C. has been proceeded. In light of such a mounting process, heat treatment (low-temperature process) at 160° C. for 1 hour and heat treatment (reflow process) at 260° C. were performed as reliability tests.

As a result of series of examination of this time, it was revealed that, as physical properties of a material of the photocurable adhesive used in formation of the adhesive layer, the smaller the mass reduction at the time of heating is, the less exfoliation is likely to occur at the time of performing such a high-temperature process.

The mass reduction at the time of heating is caused due to volatilization of low-temperature volatile components such as non-cross-linked components remaining at the time of curing of the photocurable adhesive and resin components having a low polymerization degree, portions of a cross-linked polymer having a low high-temperature resistance, and the like during the high-temperature process. A photocurable adhesive showing a large mass reduction at the time of heating causes a further large shrinkage in volume when these resin components are volatilized. Therefore, stress is generated between the adhesive layer and the polymer optical waveguide and the silicon optical waveguide, which are subjects to be adhered, and this causes problems such as exfoliation. Contrary to this, a photocurable adhesive showing a small mass reduction at the time of heating has a small shrinkage in volume at the time of performing a high-temperature process and thus, improves reliability of the adiabatic-coupling portion.

From the above viewpoint, in the composite optical waveguide 10 of the present invention, the photocurable adhesive used in formation of the adhesive layer 50 shows a mass reduction amount between before and after being maintained in an atmosphere at 150° C. for 100 hours after photocuring being preferably 6% or less, more preferably 4% or less, and further more preferably 2% or less.

Depending on the use application, there is a case where the composite optical waveguide of the present invention is exposed to a high-temperature high-humidity environment during use. In this case, the adhesive layer is required not to be exfoliated even when being exposed to the high-temperature high-humidity environment. Regarding this point, in the present invention, a high-temperature high-humidity test at 85° C. and 85% RH is taken as an index.

As a result of series of examination of this time, it was revealed that, as the physical properties of the material of the photocurable adhesive used in formation of the adhesive layer, in the case where a mass increase amount between before and after immersing the adhesive in water for 24 hours after photocuring is 1% or less, even in the high-temperature high-humidity test at 85° C. and 85% RH, exfoliation is not generated at an interface between the adhesive layer and the polymer optical waveguide and the silicon optical waveguide adhered material, which are subjects to be adhered.

In the high-temperature high-humidity test at 85° C. and 85% RH, as the volume of the photocurable adhesive (adhesive layer) is expanded due to absorption of water, stress is generated between the adhesive layer and the polymer optical waveguide and the silicon optical waveguide, which are subjects to be adhered, whereby exfoliation is easily caused. With respect to this, in the case where the mass increase amount between before and after immersing the photocurable adhesive in water for 24 hours after photocuring is 1.0% or less, since the water-absorption rate of the photocurable adhesive after photocuring is sufficiently small, a volume change occurring during the high-temperature high-humidity test at 85° C. and 85% RH becomes small, and as a result, exfoliation is hardly caused.

In the case of butt-coupling in which a thickness of the adhesive layer is 10 μm or more, the water-absorption rate of the photocurable adhesive used in coupling between the polymer optical waveguide and the silicon optical waveguide has not been particularly mentioned, and an acrylic adhesive having a relatively high water-absorption rate also complies with the Telcordia standards (high-temperature and high-humidity). However, in the case of the adiabatic-coupling in which the spacing t between the core 22 of the polymer optical waveguide 20 and the silicon optical waveguide 30, corresponding to the thickness of the adhesive layer is as extraordinarily thin as 1.5 μm or less, since stress cannot be mitigated inside the adhesive layer, characteristics of the required water-absorption rate becomes further strict as described above.

In the composite optical waveguide of the present invention, the photocurable adhesive used in formation of the adhesive layer shows a mass increase amount between before and after immersing the adhesive in water for 24 hours after photocuring being more preferably 0.5% or less, and further more preferably 0.3% or less.

In the composite optical waveguide of the present invention, a coefficient of thermal expansion of the photocurable adhesive used in formation of the adhesive layer and a coefficient of thermal expansion of the constituent material of the polymer optical waveguide or the silicon optical waveguide are preferably close to each other. This is because, at the time of performing the heat cycle test, stress generated at the interface between the adhesive layer and the polymer optical waveguide or silicon optical waveguide is reduced, and as a result exfoliation is less likely to occur. The constituent material of the polymer optical waveguide has an average coefficient of thermal expansion of approximately $80 \times 10^{-6}/°$ C. at a range of from 25° C. to 100° C., and the coefficient of thermal expansion of Si is approximately $3 \times 10^{-6}/°$ C. For this, the photocurable adhesive used in formation of the adhesive layer has an average coefficient of thermal expansion of preferably less than $130 \times 10^{-6}/°$ C. at a range of from 25° C. to 100° C., more preferably less than $110 \times 10^{-6}/°$ C., and further more preferably less than $100 \times 10^{-6}/°$ C.

The photocurable adhesive used in formation of the adhesive layer is not particularly limited as long as it satisfies the above-described physical properties. Specific examples thereof include an epoxy photocurable adhesive, a fluorine-containing epoxy photocurable adhesive, a silicone photocurable adhesive, an acrylic photocurable adhesive, a fluorine-containing acrylic photocurable adhesive, a urethane acrylate photocurable adhesive, an epoxy acrylate photocurable adhesive, and the like. Among these, the fluorine-containing epoxy photocurable adhesive is preferable in view of transparency, heat resistance, low shrinkage rate at curing, and the like.

In addition, in the case where the constituent material of the polymer optical waveguide contains fluorine, the photocurable adhesive used in formation of the adhesive layer also preferably contains fluorine because adhesion between both are improved.

The composite optical waveguide of the present invention is further described.

(Silicon Optical Waveguide)

The silicon optical waveguide 30 has a core-clad structure including a core 32 of Si and a clad 31 of $SiO_2$, formed on a silicon chip. In the illustrated silicon optical waveguide 30, a plurality of cores 32 is formed in an array shape in a form of being arranged in parallel along one direction. Here, the configuration of the silicon optical waveguide is not limited thereto. For example, although the barrier layer 60 is formed on a surface on a side of the adhesive layer 50 of the silicon optical waveguide 30, the barrier layer 60 is an optional member, and the barrier layer 60 may not be formed.

(Polymer Optical Waveguide)

The polymer optical waveguide 20 is formed of a core 22 and a clad 21 disposed therearound. Both of the core 22 and the clad 21 of the polymer optical waveguide 20 include a polymer (resin material) as the constituent material, and the constituent materials of both are selected such that a refractive index of the clad 21 is lower than a refractive index of the core 22. In order for light to propagate through the core 32 of the silicon optical waveguide 30, it is required to use infrared light having a wavelength longer than 1.1 μm which is a silicon band spacing. However, in order to suppress propagation loss of light propagating the composite optical waveguide 10 in this region, the constituent materials of the core 22 and clad 21 of the polymer optical waveguide 20 is preferably a fluorine-containing resin. The reason is that C-F coupling can suppress the absorption of light rather than C-H coupling in a long-wavelength region (in particular, C band periphery or O band periphery used in communication).

In the polymer optical waveguide 20 illustrated in FIG. 3, the cross-sectional shape of the core 22 is rectangular, but is not limited thereto and may be trapezoidal, circular, or elliptical. In the case where the cross-sectional shape of the core is polygonal, the corners thereof may be rounded.

The size of the core 22 in the polymer optical waveguide 20 is not particularly limited, and can be appropriately designed considering coupling efficiency with a light source or light receiving element, and the like. The coupling efficiency depends on a core diameter and the number of apertures (NA). For example, the size of the core 22 (in the case where the cross-sectional shape of the core 22 is rectangular, as in the core 22 illustrated in FIG. 3, width and height of the rectangle) is preferably from 1 to 10 μm, more preferably from 1.5 to 8 μm, and further more preferably from 2 to 7 μm, considering the coupling efficiency with the core 32 of the silicon optical waveguide 30.

EXAMPLES

Hereinafter, the present invention is described in more detail by using Examples below, but the present invention is not limited to these Examples. Examples 1 and 2 are Inventive Examples, and Examples 3, 4, 5, and 6 are Comparative Examples.

Figure 6:
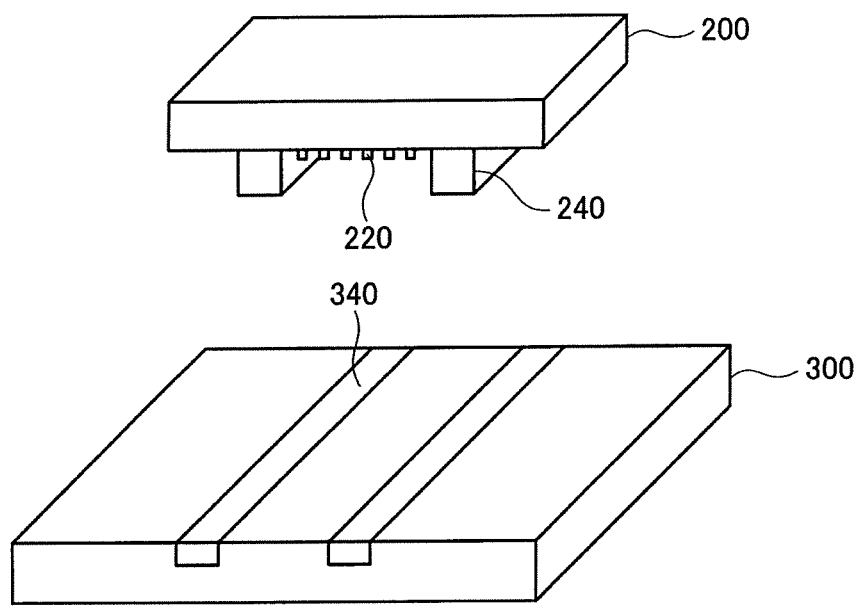
FIG. 6 is a view of a test sample used in an adhesion test of Example.

In Examples, an adhesion test was performed by using a test sample illustrated in FIG. 6. The test sample is made of a sample (a) 200 simulating a polymer optical waveguide and a sample (b) 300 simulating a silicon optical waveguide. The sample (a) 200 simulating a polymer optical waveguide includes a portion 220 simulating a core and a positioning projection portion 240. The sample (b) 300 simulating a silicon waveguide includes a positioning concave portion 340.

A silicon wafer was ground with a dicing saw to prepare the sample (b) 300 including the positioning concave portion 340. The positioning projection portion 240 of the sample (a) 200 had a width capable of being inserted into the positioning concave portion 340 of the sample (b) 300. The height of the projection portion 240 and the height of the portion 220 of the sample (a) 200 are configured such that, when inserting the projection portion 240 into the concave portion 340, a spacing of 1.5 µm or less is generated between the portion 220 and a surface of the sample (b) 300 facing the portion.

After a photocurable adhesive described in the following Table was applied on a surface on a side having the positioning concave portion 340 of the sample (b) 300, the positioning projection portion 240 of the sample (a) 200 was inserted into the concave portion 340. After removing the extra adhesive, UV light was emitted at an emission intensity of from 3 to 18 J/cm$^2$ to cure the adhesive, to thereby form an adhesive layer having a thickness of 1.5 µm or less. After that, the resultant was annealed at a lower temperature (at 60° C. or 80° C., for 1 hour), and annealing was further performed at 160° C. for 1 hour, to thereby prepare a sample for the following test.

The photocurable adhesive described in the following Table was used.

In the following Table, the glass transition point Tg is a value after photocuring of the adhesive. The glass transition point Tg is obtained in accordance with the input compensation differential scanning calorimetry described in JIS K7121. The temperature rise rate is set to 20° C. per minute, and the ambient atmosphere of a sample piece is nitrogen (50 ml per minute). In addition, the light transmittance of each of the fluorine-containing epoxy photocurable adhesives at a wavelength of 1.3 µm satisfies a transmittance of 80% or more at a thickness of 0.1 mm. Therefore, all of Examples 1 to 6 provide composite optical waveguides having extremely low transmission loss when the propagating light passes through the adhesive layer.

In addition, the mass reduction amount in the Table is a mass reduction amount between before and after maintaining the photocured adhesive at 150° C. for 100 hours, and the mass increase amount is a mass increase amount between before and after immersing the photocured adhesive (thickness of sample piece is 1 mm) in water of 23° C. for 24 hours. The both values are obtained in accordance with JIS K7209.

(Low-Temperature Process Test)

Heat treatment was performed at 160° C. for 1 hour, and presence or absence of exfoliation at the adhesion interface was visually checked and evaluated according to the following criteria.

A: Exfoliation at the adhesion interface was not confirmed.

C: Exfoliation at the adhesion interface was confirmed.

(Reflow Process Test)

Heat treatment was performed at 260° C. for 30 seconds, and presence or absence of exfoliation at the adhesion interface was visually checked and evaluated according to the following criteria.

A: Exfoliation at the adhesion interface was not confirmed.

B: Partial exfoliation at the adhesion interface was confirmed.

C: Exfoliation at the adhesion interface was confirmed.

It is sufficient that any one of the evaluation results is A in the low-temperature process test and the reflow process test.

(Heat Cycle Test)

Heat cycle in which each of the highest temperature (+125° C.) and the lowest temperature (−50° C.) was kept for 30 minutes was performed 20 cycles, and presence or absence of exfoliation at the adhesion interface was checked and evaluated according to the following criteria.

A: Exfoliation at the adhesion interface was not confirmed.

B: Partial exfoliation at the adhesion interface was confirmed.

(High-Temperature High-Humidity Test)

Heat treatment was performed at 85° C. and 85% RH for 90 hours, and presence or absence of exfoliation at the adhesion interface was visually checked and evaluated according to the following criteria.

A: Exfoliation at the adhesion interface was not confirmed.

B: Partial exfoliation at the adhesion interface was confirmed.

The results are shown in the following Tables.

TABLE 1

| | Photocurable adhesive | Tg (° C.) | Average coefficient of thermal expansion (10$^{-6}$) (25° C. to 100° C.) | Mass reduction amount/% (maintained at 150° C. for 100 hours) | Mass increase amount/% (between before and after immersing in water for 24 hours) |
|---|---|---|---|---|---|
| Example 1 | Fluorine-containing epoxy (1) | 138 | 90 | 0 | 0.3 |
| Example 2 | Fluorine-containing epoxy (2) | 145 | 100 | Approximately 0 | 1.3 |
| Example 3 | Acrylic (1) | 86 | 200 | 4 | 2 |
| Example 4 | Acrylic (2) | −3 | 200 | 2 | 2 |
| Example 5 | Acrylic (3) | 111 | 200 | 1 | 6 |
| Example 6 | Fluorine-containing epoxy (3) | 49 | 140 | 8 | 0.3 |

TABLE 2

| | Photocurable adhesive | Low-temperature process 160° C. 1 hour | Reflow 260° C. 30 sec. | Heat cycle −50/+100° C. 20 cycle | High-temperature high-humidity 85° C. 85% |
|---|---|---|---|---|---|
| Example 1 | Fluorine-containing epoxy (1) | A | A | A | A |
| Example 2 | Fluorine-containing epoxy (2) | A | A | A | B |
| Example 3 | Acrylic (1) | A | A | B | B |
| Example 4 | Acrylic (2) | A | A | B | B |
| Example 5 | Acrylic (3) | A | B | B | B |
| Example 6 | Fluorine-containing epoxy (3) | C | C | B | A |

In Examples 3, 4, 5, and 6 in which a photocurable adhesive having a Tg after photocuring of lower than 125° C. was used, since a temperature of the test sample during the heat cycle test exceeded the glass transition point Tg after photocuring, the volume of the photocurable adhesive (adhesive layer) was significantly increased, with this, stress between the adhesive layer and the polymer optical waveguide and the silicon optical waveguide which are subjects to be adhered was generated, and thus exfoliation occurred.

Contrary to this, in both of Examples 1 and 2 in which a photocurable adhesive having a Tg after photocuring of 125° C. or higher was used, the result of the heat cycle test was favorable.

In Examples 1 and 2 in which a photocurable adhesive having an average coefficient of thermal expansion of less than $130 \times 10^{-6}/°$ C. at a range of from 25° C. to 100° C. was used, since the average coefficient of thermal expansion of the photocurable adhesive is close to the average coefficient of thermal expansion (approximately $80 \times 10^{-6}/°$ C.) of the constituent material of the polymer optical waveguide and the average coefficient of thermal expansion (approximately $3 \times 10^{-6}/°$ C.) of Si, at the time of performing the heat cycle test, stress generated at the interface between the adhesive layer and the polymer optical waveguide is reduced, and as a result, exfoliation is hardly caused. Measurement of the average coefficient of thermal expansion is performed in accordance with JIS K7197. The temperature rise rate is 5° C. per minute and the ambient atmosphere of the test piece is nitrogen (50 ml per minute).

In Examples 1 to 5 in which a photocurable adhesive having a mass decrease amount of less than 6% between before and after being maintained in the atmosphere at 150° C. for 100 hours after photocuring was used, the result of the low-temperature process test was favorable.

In Examples 1 and 6 showing a mass increase amount of 1% or less between before and after being immersed in water for 24 hours after photocuring, the result of the high-temperature high-humidity test was favorable.

In Examples shown below, regarding the composite optical waveguide 10 having a structure illustrated in FIGS. 4 and 5, the structures (size and refractive index) of the polymer optical waveguide 20 and the silicon optical waveguide 30 were defined by using RSoft CAD manufactured by RSoft Design Group, Inc., and simulation of light propagation was performed by using BeamProp (finite difference beam propagation method) manufactured by RSoft Design Group, Inc. which is a simulation engine. FIG. 4 is a cross-sectional view of the case where a resin optical waveguide and a silicon (Si) optical waveguide are adiabatically coupled, and FIG. 5 is a lateral view.

Examples 7 to 24

Among Examples 7 to 24, Examples 7 to 14 and 16 to 23 are Inventive Examples, and Examples 15 and 24 are Comparative Examples.

The structures (size and refractive index) of the polymer optical waveguide 20 and the silicon optical waveguide 30 were defined by using RSoft CAD, as shown below.

(Polymer Optical Waveguide 20)
  Core 22
  Core size: width 6.0 μm, thickness 2.0 μm
  Refractive index: 1.526
  Clad 21
  Thickness: 15 μm
  Refractive index: 1.513

(Silicon Optical Waveguide 30)
  Core 32
  Core size: width 0.38 μm (a end) to 0.11 μm (b end)
  Width is linearly changed along the a end to the b end
  Thickness: 0.18 μm
  Refractive index: 3.5
  Clad 31
  Thickness: 15 μm
  Refractive index: 1.45

(Barrier Layer 60)
  Thickness: 0.03 μm
  Refractive index: 1.989

The length of the adiabatic coupling portion 70, in which the core 22 of the polymer optical waveguide 20 and the core 32 of the silicon optical waveguide 30 are disposed in a state of facing each other and bonded by the adhesive layer 50, was set as 1750 μm, and connection loss at a wavelength of 1.3 μm was obtained by calculation using BeamProp. The results are shown in the following Tables 3 to 5. The refractive index difference (n1−nA) in the Tables is a refractive index difference between the refractive index n1 of the clad 22 of the polymer optical waveguide 20 and the refractive index nA of the photocurable adhesive used in formation of the adhesive layer 50 after photocuring, and the spacing t is a spacing t between the core 22 of the polymer optical waveguide 20 and the silicon optical waveguide 30.

TABLE 3

|  | Example 7 | Example 8 | Example 9 | Example 10 | Example 11 | Example 12 | Example 13 | Example 14 |
|---|---|---|---|---|---|---|---|---|
| Refractive index difference (n1 − nA) | 0.050 | 0.040 | 0.030 | 0.030 | 0.020 | 0.010 | 0.010 | 0.010 |
| Spacing t (μm) | 0.5 | 0.5 | 0.5 | 1.0 | 0.5 | 0.5 | 1.0 | 1.5 |
| Connection loss (dB) | 0.9 | 0.6 | 0.5 | 1.5 | 0.4 | 0.4 | 0.3 | 1.1 |

TABLE 4

|  | Example 15 | Example 16 | Example 17 | Example 18 | Example 19 | Example 20 | Example 21 | Example 22 |
|---|---|---|---|---|---|---|---|---|
| Refractive index difference (n1 − nA) | 0.010 | 0.000 | −0.005 | −0.005 | −0.005 | −0.010 | −0.013 | −0.015 |
| Spacing t (μm) | 2.0 | 0.5 | 0.5 | 1.0 | 1.5 | 2.0 | 0.5 | 0.5 |
| Connection loss (dB) | 3.3 | 0.5 | 0.6 | 0.5 | 0.5 | 0.7 | 0.9 | 1.1 |

TABLE 5

|  | Example 23 | Example 24 |
|---|---|---|
| Refractive index difference (n1 − nA) | −0.015 | −0.020 |
| Spacing t (μm) | 1.0 | 0.5 |
| Connection loss (dB) | 1.5 | 4.2 |

As shown in Examples 7 to 14 and Examples 16 to 23, in the case where the difference (n1−nA) between the refractive index n1 of the clad of the polymer optical waveguide and the refractive index nA of the photocured adhesive is from −0.015 to 0.05, the polymer optical waveguide and the silicon waveguide can be connected to each other at a loss of 1.5 dB or less. On the other hand, as shown in Comparative Example 24, in the case where the difference (n1−nA) between the refractive index n1 of the clad of the polymer optical waveguide and the refractive index nA of the photocured adhesive is −0.02, the connection loss is a large value exceeding 4 dB. In addition, as shown in Examples, it can be recognized that, in the case where the spacing t between the core of the polymer optical waveguide and the silicon waveguide is less than 1.5 μm, the polymer optical waveguide and the silicon waveguide can be connected to each other at 1.5 dB or less.

Although the present invention has been described in detail and with reference to specific embodiments, it is apparent to those skilled in the art that various changes and modifications can be made without departing from the gist and the scope of the present invention. The present application is based on Japanese Patent Application (No. 2016-58907) filed on Mar. 23, 2016, which contents are incorporated herein by reference.

REFERENCE SIGNS LIST

10: Composite optical waveguide
20, 200: Polymer optical waveguide
21: Clad of polymer optical waveguide
22, 220: Core of polymer optical waveguide
24, 240: Positioning projection portion
30, 300: Silicon optical waveguide
31: Clad of silicon waveguide
32: Core of silicon waveguide
34, 340: Positioning concave portion
40: Connector
50: Adhesive layer
60: Barrier layer
70: Adiabatic-coupling portion

The invention claimed is:

1. A composite optical waveguide, comprising:
   a polymer optical waveguide; and
   a silicon optical waveguide,
   wherein the polymer optical waveguide and the silicon optical waveguide are adiabatically coupled to each other by an adhesive layer in an adiabatic-coupling portion where a core of the polymer optical waveguide and a core of the silicon optical waveguide are disposed to face each other,
   the adhesive layer is formed by a photocurable adhesive having a glass transition point Tg of 125° C. or higher after curing, and satisfying $-0.015 \leq n1-nA < 0.05$ where n1 represents a refractive index of a clad of the polymer optical waveguide and nA represents a refractive index of the adhesive after curing, and
   the adiabatic-coupling portion comprises a region in which a spacing t between the core of the polymer optical waveguide and the silicon optical waveguide is 1.5 μm or less.

2. The composite optical waveguide according to claim 1, wherein the photocurable adhesive shows a mass increase amount of 1% or less between before and after being immersed in water for 24 hours after photocuring.

3. The composite optical waveguide according to claim 1, wherein the photocurable adhesive has an average coefficient of thermal expansion of less than $130 \times 10^{-6}$/° C. at a range of from 25° C. to 100° C.

4. The composite optical waveguide according to claim 1, wherein the polymer optical waveguide comprises a fluorine-containing resin.

5. The composite optical waveguide according to claim 4, wherein the photocurable adhesive comprises a fluorine material.

6. The composite optical waveguide according to claim 1, further comprising:
   a barrier layer formed on a surface of the silicon optical waveguide on a side of the adhesive layer.

7. The composite optical waveguide according to claim 1, wherein the photocurable adhesive has a transmittance of light with a wavelength of 1.3 μm of 80% or greater at a thickness of 0.1 mm after curing.

8. The composite optical waveguide according to claim 7, wherein the photocurable adhesive shows a mass reduction amount of 6% or less between before and after being maintained in an atmosphere at 150° C. for 100 hours after photocuring.

9. The composite optical waveguide according to claim 7, wherein the photocurable adhesive shows a mass increase amount of 1% or less between before and after being immersed in water for 24 hours after photocuring.

10. The composite optical waveguide according to claim 7, wherein the photocurable adhesive has an average coefficient of thermal expansion of less than $130 \times 10^{-6}/°$ C. at a range of from 25° C. to 100° C.

11. The composite optical waveguide according to claim 7, wherein the polymer optical waveguide comprises a fluorine-containing resin.

12. The composite optical waveguide according to claim 11, wherein the photocurable adhesive comprises a fluorine material.

13. The composite optical waveguide according to claim 1, wherein no clad portion is provided on a side of the core of the polymer optical waveguide facing the core of the silicon optical waveguide such that the adhesive layer is directly provided on the side of the core of the polymer optical waveguide facing the core of the silicon optical waveguide.

14. The composite optical waveguide according to claim 1, wherein the photocurable adhesive shows a mass reduction amount of 6% or less between before and after being maintained in an atmosphere at 150° C. for 100 hours after photocuring.

* * * * *